May 1, 1934.  F. WALDORF  1,957,054
PACKING FOR SHAFT BEARINGS
Filed June 3, 1929
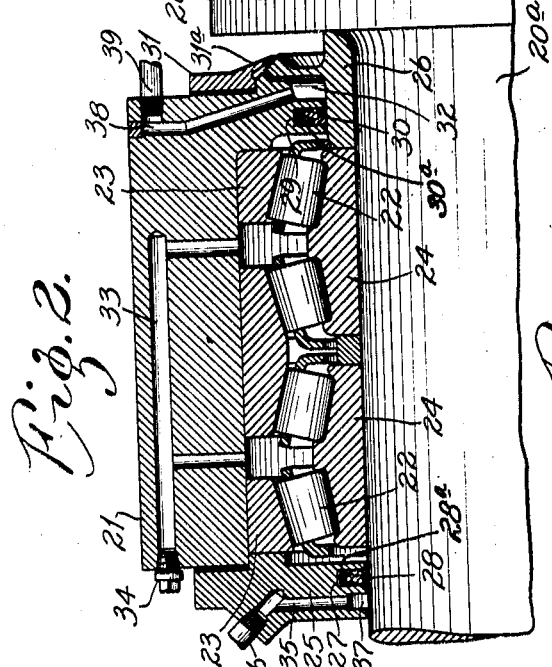
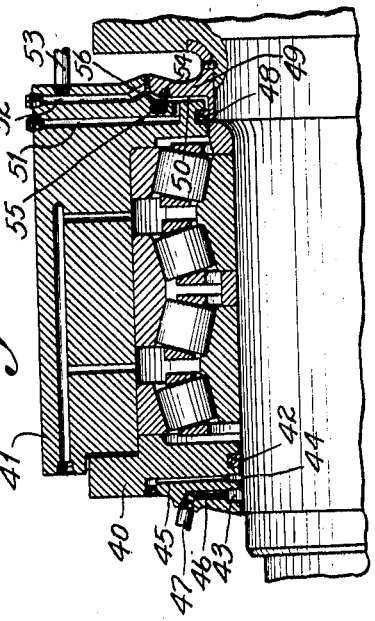
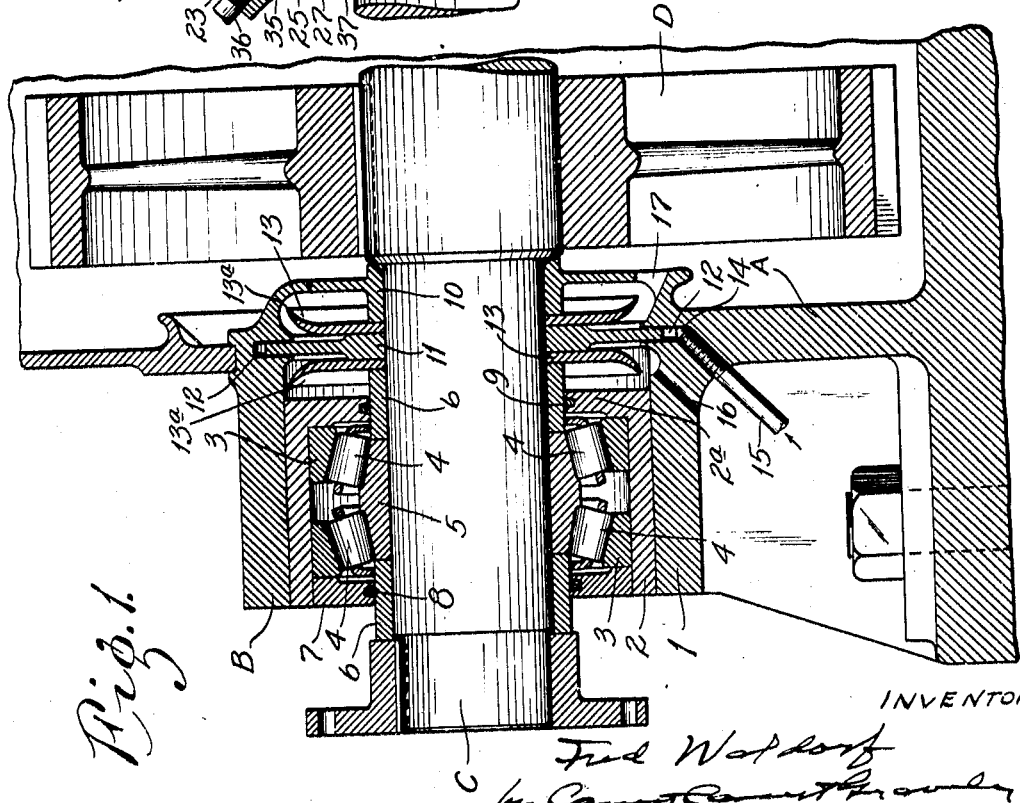
INVENTOR
Fred Waldorf
by [signature]
HIS ATTORNEY Patented May 1, 1934

1,957,054

UNITED STATES PATENT OFFICE 1,957,054

PACKING FOR SHAFT BEARINGS

Fred Waldorf, Pittsburgh, Pa., assignor to The Timken Roller Bearing Company, Canton, Ohio, a corporation of Ohio Application June 3, 1929, Serial No. 367,861

4 Claims. (Cl. 286—9)

This invention relates to bearings for the shafts of machinery, and has for its principal objects to provide efficient means for preventing the escape of lubricant from and the entry of dust and other foreign matter into the shaft bearing. Another object is to prevent heavy lubricant in a gear case from escaping through the shaft bearing thereof and mixing with the lighter lubricant in said bearing. Other objects are simplicity and cheapness of construction and compactness of design. The invention consists principally in providing the shaft bearing with fluid pressure means for preventing the escape of oil from the bearing and the entry of other oil and foreign matter into said bearing. The invention also consists in the parts and combinations and arrangements of parts hereinafter described and claimed.

In the accompanying drawing, which forms part of this specification and wherein like symbols refer to like parts wherever they occur, Fig. 1 is a longitudinal sectional view through the oil containing shaft bearing of an oil containing gear casing provided with oil retaining means embodying my invention;

Fig. 2 is a longitudinal sectional view of the shaft of a rolling mill provided with oil retaining means embodying my invention; and Fig. 3 is a view similar to Fig. 2, showing a modified form of oil retaining means.

In Fig. 1 of the drawing, my invention is illustrated as applied to the shaft bearing of an ordinary type of gear reduction unit, of which only a portion is shown. Said unit comprises a suitable gear casing or housing A whose end wall is provided with a bearing B in which is journaled a shaft C, which extends into said casing and has one of the reduction gears D fixed thereon. In such construction, the gear casing A is adapted to contain a heavy lubricant, and the shaft bearing is adapted to contain a lighter lubricant. The shaft bearing B comprises a hollow tubular journal box or housing 1 that projects horizontally from the end wall of the gear casing A, and has a cylindrical sleeve 2 mounted therein in which are seated the cups or outer bearing members 3 of two conical roller bearings whose bearing rollers 4 are interposed between said cups and a double cone 5, which is mounted on the shaft C and constitutes the inner bearing members for both bearings. Suitable spacing sleeves 6 are mounted on the shaft C on opposite sides of the double cone 5. The annular space in which the bearings are located is closed at the outer end of the cup supporting sleeve 2 by means of an annular closure member 7 provided with a packing ring 8 which bears against the outer spacing sleeve 6; and said annular space is closed at the inner end of said cup supporting sleeve by means of an inwardly extending annular flange 2a provided with a packing ring 9 which bears against the inner spacing sleeve 6. By this arrangement the annular bearing receiving space is closed at both ends and serves as a chamber for containing a light lubricant for the two roller bearings.

The annular space between the shaft C and the inner end of the shaft receiving opening in the journal box or housing 1 is closed by means of an annular closure member 10 sleeved on said shaft. Mounted on the shaft between the inner spacing sleeve 6 and the closure member 10 is an annular plate 11 whose peripheral edge portion works in an internal groove 12 provided therefor in the journal box 1. Sleeved on said shaft on opposite sides of said annular plate 11 are annular baffle or deflector plates 13 that are of smaller diameter than the opening in the journal box and have their peripheral portions 13a flared or curved slightly away from said annular plate.

Extending through the wall of the journal box is an air inlet passageway 14, which communicates at its inner end with the bottom of the internal groove 12 that receives the peripheral edge of the annular plate 11 and at its outer end with a pipe 15 leading from a suitable source of air or other fluid pressure. An outlet passageway 16 extends through the wall of the journal box and communicates at its inner end with the annular space or chamber between the inner end of the cup supporting sleeve and the annular plate 11. A similar outlet passage 17 extends through the wall of the journal box and communicates at its inner end with the annular space between the annular plate 11 and the annular closure member 10.

With the above arrangement, air from the inlet passage flows into the annular groove 12 and thence passes on opposite sides of the plate 11 cooperating with said groove around the flared edges 13a of the annular deflector plates 13 into the annular chambers or spaces on opposite sides of said plate and escapes through the outlet passageways 16 and 17, thereby preventing the light oil in the bearing from entering the gear case and the heavy oil in the latter from entering the bearing.

In the construction shown in Fig. 2 the invention is shown in connection with a bearing for rotatably supporting one end of a roll 20 for a rolling mill. In said construction, the neck 20a of the roll extends through the bearing housing or journal box 21, and conical roller bearings are interposed between said neck and the opening in said housing. As shown in the drawing, there are four conical roller bearings, the conical bearing rollers 22 being interposed between conical cups 23 seated in the shaft receiving opening in the bearing housing, and the cones 24 being mounted on the neck of the roll.

The outer end of the bearing housing is closed by means of an annular closure plate 25 sleeved on the roll neck and removably secured to the outer end face of the housing; and likewise the inner end of said housing is closed by means of an annular closure member 26 having a hub portion which is sleeved on said roll neck and provided with an annular flange that overlaps the inner end of the shaft receiving opening. The closure plate 25 for the outer end of the bearing is provided with an annular groove 27 adapted to receive a suitable packing ring 28 that embraces the roll neck; and the inner end of the shaft receiving opening of the housing likewise is provided with a similar annular groove 29 having a packing ring 30 seated therein adapted to embrace the hub of the closure member 26. Encircling the packing rings 28 and 30 are annular coil springs 28a and 30a, respectively, that cause said rings to closely hug or embrace the parts which they surround. Removably secured to the inner end face of the bearing housing is an annular plate 31 provided at its inner periphery with an inclined flange 31a which overlaps but is spaced slightly from the peripheral edge of the annular outstanding flange of the closure member 26. The bearing housing is provided adjacent to the inner end of its shaft receiving opening with an annular recess that cooperates with the closure member 26 to form an annular chamber 32. A suitable space is left between the end of the bearing housing and the overlapping flange of the closure member 26 for the purpose of establishing communication between said chamber 32 and the space beneath the overlapping inclined flange 31a of the annular plate 31. Lubricant is supplied to the bearings through a passageway 33 located in the bearing housing whose outer end is closed by means of a suitable plug 34.

The outer closure plate 25 is provided with an inlet passageway 35 whose outer end communicates through a pipe 36 with a suitable source of air or water supply, and whose inner end communicates with an annular groove or chamber 37 formed in the inner periphery of the closure plate outside of the packing ring 28. At its inner end the bearing housing is provided with a passageway 38 whose outer end communicates through a pipe 39 with a suitable source of air or water supply and whose inner end communicates with the annular chamber 32. By this arrangement, the pressure of the water or air in the annular chambers 32 and 37 at the ends of the shaft bearing operates to prevent the escape of oil from the ends of the bearing. At the same time, the escape of the fluid through the joint between the outer closure plate and the shaft, and thence through the joint between said annular flange of the inner closure member and the overlapping inclined flange of the annular member, prevents the entry of scale or other foreign matter into the bearing.

In the modified construction shown in Fig. 3 the closure plate 40 for the outer end of the bearing receiving opening of the bearing housing 41 is provided adjacent to the outer edge of the packing ring 42 with two longitudinally spaced annular grooves 43 and 44, respectively. Said closure plate is provided with a passageway 45 for supplying a heavy lubricant or grease to the annular groove 44 located next to the packing ring. Said closure plate is also provided with a passageway 46, whose outer end communicates through a pipe 47 with a suitable source of air or water supply and whose inner end communicates with the outer annular groove 43. The inner end of the shaft receiving opening of the bearing housing is provided with a packing ring 48; and the end face of said housing is provided with a circular recess adapted to accommodate the annular member 49 fixed to the neck of the roll. A suitable space 50 is left between the opposing faces of the circular recess and the member seated therein; and a heavy lubricant or grease is supplied to said space through a passageway 51 whose outer end is closed by means of a screw plug and whose inner end opens into said space through the end thereof. Air or water is supplied to the space between the housing and closure member 49 through a passageway 52, whose outer end communicates with a supply pipe 53 and whose inner end opens into said space adjacent to the peripheral edge of said closure member. A baffle ring 54 is secured by means of a threaded ring 55 in a circular groove 56 provided therefor in the circular recess in the end of the housing, and projects across the space 50 between the opposing faces of said circular recess and said closure member into a circular recess formed in the latter.

By this arrangement, pressure of the fluid in the groove 43 and space 50 at the outer and inner ends, respectively, of the bearing operates to force the heavy lubricant located adjacent to the outside faces of the packing rings towards the latter and thus forms a seal for preventing the escape of the lubricant from the chamber containing the antifriction bearings. At the same time, the escape of air from the groove 43 and space 50 prevents dust, grit, scale or other foreign matter from working into the ends of the bearing.

The foregoing invention is applicable to the bearings for shafts of machinery of various kinds, and it is evident that changes may be made without departing from the invention.

What I claim is:

1. A shaft bearing comprising a housing having a shaft receiving opening, a shaft mounted in said opening, said housing being provided at one end of its shaft receiving opening with an annular groove, an annular member sleeved on said shaft with its peripheral portion seated in said annular groove, and means for supplying fluid under pressure to said annular groove.

2. A shaft bearing comprising a housing having a shaft receiving opening, a shaft mounted in said opening, said housing being provided at one end of its shaft receiving opening with an anular groove, an annular member sleeved on said shaft with its peripheral portion seated in said annular groove, and means for supplying fluid under pressure to said annular groove, said housing being provided with an opening located adjacent to the inner face of said annular member for permitting the escape of said fluid from said bearing.

3. The combination of a casing adapted to contain lubricant, a bearing in one wall of said casing comprising a housing having a shaft receiving opening communicating with said casing, a shaft journaled in the shaft receiving opening of said bearing, an annular closure member sleeved on said shaft for closing the annular space between the same and the inner end of the shaft receiving opening, an annular plate sleeved on said shaft in said opening with its peripheral portion working in an annular groove in said shaft receiving opening, and annular baffle plates sleeved on said shaft on opposite sides of said annular plate with their peripheral portions terminating short of the shaft receiving opening and curved away from the annular plate, said housing being provided with an inlet port communicating with the annular groove in said shaft receiving opening and an outlet port leading from the interior of the housing adjacent to the curved peripheral edges of said baffle plates.

4. A lubricant containing shaft bearing comprising a housing having a shaft receiving opening, a shaft mounted in said opening, an annular closure member surrounding said shaft at one end of said bearing, said bearing being provided with a chamber that surrounds said shaft between the lubricant containing portion of said bearing and said annular closure member, said chamber being provided intermediate its ends with an annular groove, an annular member sleeved on said shaft with its peripheral portion seated in said annular groove, and means for supplying fluid under pressure to said annular groove.

FRED WALDORF.